United States Patent [19]

Chen et al.

[11] 4,120,801

[45] Oct. 17, 1978

[54] WATERFLOODING PROCESS EMPLOYING ANIONIC-NONIONIC COPOLYMER

[75] Inventors: Catherine S. H. Chen, Berkeley Heights; Frederick C. Schwab, Metuchen; Edward W. Sheppard, Lambertville, all of N.J.

[73] Assignee: Mobil Oil Corporation, New York, N.Y.

[21] Appl. No.: 799,487

[22] Filed: May 23, 1977

[51] Int. Cl.$^2$ ............................................. E21B 43/22
[52] U.S. Cl. ................................ 252/8.55 D; 166/274; 166/275; 260/879; 260/880 R; 260/880 B
[58] Field of Search .................. 252/8.55 D; 166/275, 166/274; 260/880 B, 880 R

[56] References Cited

U.S. PATENT DOCUMENTS

| | | | |
|---|---|---|---|
| 2,802,785 | 8/1957 | Nowak et al. | 252/8.55 |
| 3,085,063 | 4/1963 | Turbak | 252/8.55 |
| 3,116,791 | 1/1964 | Sandiford et al. | 166/274 |
| 3,583,486 | 6/1971 | Stratton | 166/274 |
| 3,607,979 | 9/1971 | Winkler | 260/880 B X |
| 3,642,953 | 2/1972 | O'Neill et al. | 260/880 B |
| 3,984,333 | 10/1976 | van de Kraats et al. | 252/8.55 |

OTHER PUBLICATIONS

Foster et al., Article in Journal of Petroleum Technology, vol. 25, Feb. 1973, pp. 205–210.

Primary Examiner—Herbert B. Guynn
Attorney, Agent, or Firm—C. A. Huggett; Henry L. Ehrlich

[57] ABSTRACT

This specification discloses a waterflooding process for producing oil from an oil-containing subterranean formation that is penetrated by an injection well and a production well. An aqueous solution of a water soluble copolymer having segments formed of blocks of an aromatic monomer and blocks of an olefinic monomer chemically modified to have an anionic function on the olefinic segments is injected into the formation to improve the recovery of oil therefrom.

5 Claims, 5 Drawing Figures

WATERFLOODING PROCESS EMPLOYING ANIONIC-NONIONIC COPOLYMER

BACKGROUND OF THE INVENTION

This invention relates to the recovery of oil from a subterranean oil-containing formation and, more particularly, relates to an improved low tension waterflooding process wherein there is incorporated in the water injected into the formation an anionic-nonionic copolymer.

Waterflooding processes have long been used in the recovery of oil from oil-containing formations or oil reservoirs. Generally, in accordance with these processes at least an injection well and a production well are provided which communicate with the reservoir and water is injected thereinto via the injection well and oil is produced therefrom via the production well. Many modifications of the basic waterflooding processes have been employed. These modifications include the use of various chemicals and materials in the water injected into the formation to improve the recovery of oil therefrom. Surfactants have been included to reduce the interfacial tension between the injected water and the reservoir oil and thereby facilitate the recovery of the oil from the reservoir. Such waterflooding processes are commonly referred to as low tension waterflooding processes. Materials and in particular polymers have been employed in the water to increase the viscosity thereof and thereby improve the efficiency of the water in displacing the oil from the reservoir.

Various problems have been encountered in carrying out low tension waterflooding processes. One problem results because of reactions which commonly take place between the divalent ions found in formation brines, primarily calcium and magnesium ions, and the chemicals in the surfactant or mobility control slugs and result in the forming of insoluble precipitants which reduce the permeability of the formation. Another problem revolves around driving the surfactant slug uniformly through the formation to thus obtain good sweep efficiency and efficiently displace the oil from the formation to production wells.

In U.S. Pat. No. 2,802,785 there is described a waterflooding process in which the flooding medium comprises an aqueous solution of certain surface active agents which are amphoteric in nature, i.e., which ionize in such manner that both anionic and cationic functional groups are an integral part of the molecule. In addition to their surface active properties, these agents have strong bactericidal action and do not precipitate alkaline-earth metal salts. The bactericidal surface active agents employed are the acid salts of amido-acids having the general formula:

R—CONH—(CH$_2$CH$_2$NH)$_x$—R'—COOH wherein R represents an alkyl group containing from about 10 to 22 carbon atoms, x represents a numerical value from 0 to 4, inclusive, and R' represents a divalent aliphatic radical containing from 1 to 3 carbon atoms.

In a paper by W. R. Foster entitled "A Low-Tension Waterflooding Process", Journal of Petroleum Technology, Vol. 25, February 1973, pp. 205-210, there is described a waterflooding process wherein three slugs of water with different chemical compositions are injected into a formation, which slugs are denoted as a protective slug, a surfactant slug, and a mobility control slug. The protective slug is an aqueous solution of sodium chloride injected for the purpose of screening the low tension surfactant of the surfactant slug from the reservoir brine and base exchanging the reservoir solids—replacing magnesium and calcium with sodium ions. The surfactant slug contains the same sodium chloride content as the protective slug and contains a selected petroleum sulfonate. The primary purpose of the surfactant slug is to reduce the interfacial tension between the oil and the water to the order of 0.001 dyne/cm. The mobility control slug has considerably less sodium chloride content than the other two slugs and contains a water soluble biopolymer in a sufficient concentration to provide a locally stable mobility condition at the rear of the oil bank. The sequence of three slugs can be driven through the formation by the original reservoir brine.

In U.S. Pat. No. 3,984,333 there is described an oil recovery process in which an aqueous solution is injected into a reservoir to displace oil through the reservoir and wherein the aqueous solution is thickened with a substantially linear block copolymer containing both water soluble and water insoluble polymer chains. Suitable block copolymers comprise blocks of sulfonated polystyrene mixed with blocks of hydrogenated-polyisoprene or hydrogenated-polybutadiene.

In U.S. Pat. No. 3,085,063 there is disclosed an invention which is concerned with waterflooding and more particularly with the use of an improved class of water thickening agents wherein aldehyde solutions are used in the waterflood. The preferred water thickening agents are selected from the class of compounds comprising sulfonated polymers. Desirable polymers are polyvinyl aromatic sulfonates, as, for example, polyvinyl toluene sulfonates. Other water thickening agents may comprise sulfonated polymers as, for example, polyvinyl toluene sulfonates, polystyrene sulfonates, or substituted polystyrene sulfonates. Still other desirable water thickening agents may be secured by copolymerizing vinyl aromatics such as styrene, vinyl toluene, vinyl naphthalene, and the like, with maleic anhydride.

In U.S. Pat. No. 3,116,791 there is described a waterflooding process wherein there is employed a viscous aqueous solution of a water soluble alkylene oxide polymer. The alkylene oxide polymers used are the water soluble polymers of ethylene oxide, propylene oxide and butylene oxide. In addition to these alkylene oxide homopolymers there may also be employed copolymers of such alkylene oxides with other epoxy compounds, such as the epoxybutanes, butadiene oxide, and styrene oxides.

In U.S. Pat. No. 3,583,486 there is described an improved waterflooding technique wherein there is included in the water injected into an oil-bearing formation an additive which has both surface active and viscosifying properties, which additive is an ethoxylated condensation product of a phenol and formaldehyde.

SUMMARY OF THE INVENTION

This invention is directed to an improved waterflooding method of recovering oil from an oil-containing subterranean formation penetrated by an injection well and a production well. A water soluble copolymer having long sequences of an oil soluble nonionic segment formed of polymer blocks of an aromatic monomer, and long sequences of a water soluble anionic segment formed of block polymers of an olefinic monomer chemically modified to provide the anionic function thereon is employed in at least a portion of the water injected via the injection well into the formation.

DESCRIPTION OF THE PREFERRED EMBODIMENTS

Figure 1:
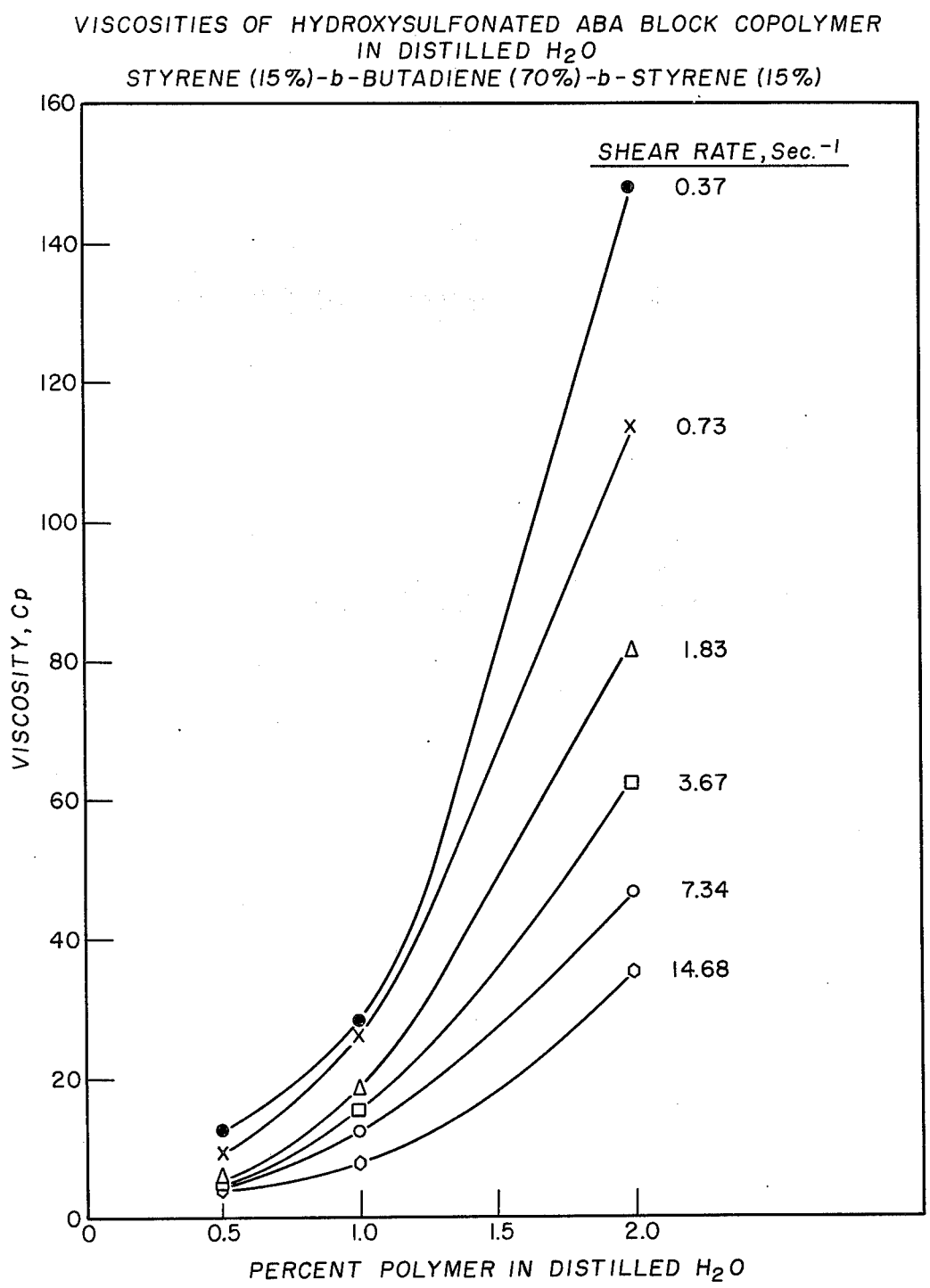
FIG. 1 is a plot of curves illustrating the change in viscosity with concentration at different shear rates of a hydroxysulfonated ABA block copolymer in distilled water, styrene (15%)-b-butadiene (70%)-b-styrene (15%).

This invention is directed to an improved waterflooding method for recovering oil from an oil-containing subterranean formation.

In accordance with this invention there is employed in at least a portion of the water injected into the formation an aqueous solution of a block or graft copolymer having long sequences of an oil soluble nonionic segment formed of polymer blocks of an aromatic monomer, and long sequences of a water soluble anionic segment formed of block polymers of an olefinic monomer chemically modified to provide the anionic function thereon. The copolymers are of relatively low molecular weight, normally within the range of 50,000 to 500,000 and provide adequate viscosity when dissolved in an aqueous solution for use in a waterflooding process to displace oil from an oil-containing formation. The copolymers are brine-resistant and thus can be used in the presence of oil field brines that contain divalent metal ions without causing harmful precipitation of insoluble precipitants, and without material loss of viscosity.

The monomers used for forming the aromatic and olefinic segments are styrene, butadiene and their derivatives. Hereafter, for simplicity, this invention will be further described with reference to the copolymers formed from the monomers styrene and butadiene.

In forming the copolymers of this invention the polybutadiene segments of a polystyrene-polybutadiene copolymer formed of blocks of polystyrene and blocks of polybutadiene are selectively sulfonated to the exclusion of the polystyrene segments. A detailed description of a technique of selectively sulfonating the olefinic segments of copolymers formed of aromatic and olefinic segments is given in our copending application filed on even date entitled SELECTIVELY SULFONATING OLEFINIC SITES OF COPOLYMERS HAVING OLEFINIC AND AROMATIC SEGMENTS, by Edward W. Sheppard, Frederick C. Schwab, and Catherine S. H. Chen, U.S. Ser. No. 799,488, filed May 23, 1977, and this copending application is incorporated by reference. As there described a liquid sulfur trioxide complex of intermediate stability is used for carrying out this sulfonation. The liquid sulfur trioxide is complexed with triethylphosphate in about a 1:1 mole ratio and used in an organic reaction medium to sulfonate the residual double bonds of the butadiene segments of a styrene-butadiene copolymer without sulfonating the styrene ring. By this method of sulfonation the butadiene segments of the copolymer are sulfonated to the exclusion of the styrene segments. Subsequently hydrolyzing the sulfonation product produces a hydroxysulfonated styrene-butadiene copolymer that is tolerant to the divalent ions, calcium and magnesium, commonly found in oil field brines.

The styrene-butadiene copolymer, after sulfonation of the butadiene segments, may further be treated to hydrolyze the residual double bonds of the polybutadiene segments and convert the copolymer to a hydroxysulfonate as illustrated by the following formula:

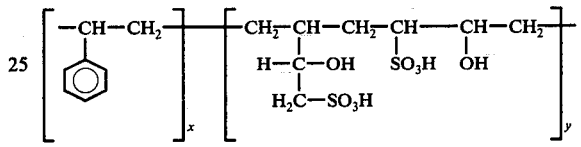

The hydrophilic butadiene block is illustrated as being formed of a random arrangement of 1,2 and 1,4 placement of the double bonds of the butadiene monomer. The degree of 1,2 placement and 1,4 placement may vary from about 5 to about 95 mole percent of either.

Such styrene-butadiene copolymers are essentially water soluble when $x$ is small as compared to $y$, that is, when $x$ as compared to $y$ is equal to or less than 1, and oil soluble when $x$ is large as compared to $y$, that is, when $x$ as compared to $y$ is equal or greater than 1. It is the water soluble copolymers that are utilized in the improved waterflooding process of this invention.

The polymer skeletons of the anionic-nonionic copolymers are constructed from styrene and butadiene. These copolymers may be constructed either as block or graft copolymers in the molecular architecture as represented by the structures I to VIII shown below wherein S—S—S represents a block of polystyrene and B~B~B represents a block of polybutadiene. Alternatively, these copolymers could be represented using the letter A in place of S—S—S to represent a block of polystyrene and the letter B in place of B~B~B to represent a block of polybutadiene. Thus, structure I would be illustrated as an AB copolymer and structure II as an ABA copolymer. The polybutadiene blocks are formed of a random mixture of 1,2 and 1,4 placements which may be varied from about 5 to 95 mole percent of either.

I. S—S—S—B~B~B
II. S—S—S—B~B~B—S—S—S
III. B~B~B—S—S—S—B~B~B

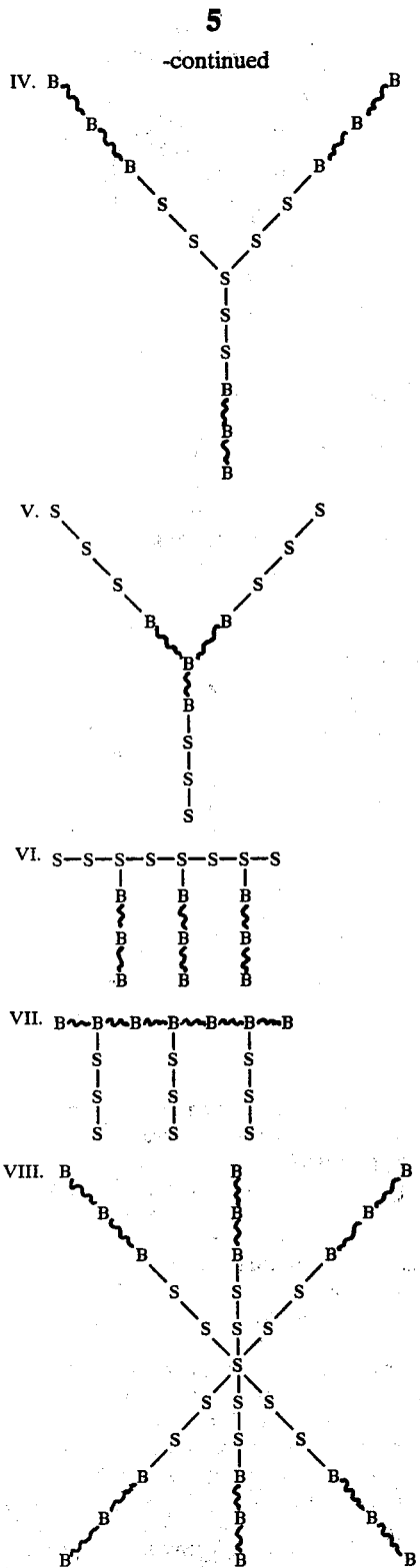

ular weight of these copolymers varied from Mw = 1 × 10⁵ to 1 × 10⁷.

The polybutadiene segments were polymerized by 50 to 90 percent 1,2-addition, therefore, contained 50–90% 1,2 placement of the double bonds of the butadiene monomer.

Each structure was characterized by molecular weight determinations; molecular weight-intrinsic viscosity relationship; fractionation by GPC (gel permeation chromatography); proton; and $C_{13}$ NMR (Nuclear Magnetic Resonance).

EXAMPLE II

The styrene-butadiene copolymers were converted to hydroxysulfonates through the α-olefinic double bonds on the polybutadiene blocks by sulfonation using complexes of sulfur trioxide. The hydroxysulfonated copolymers, as exemplified below:

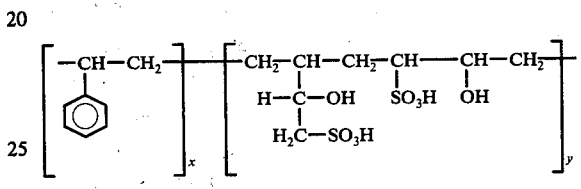

are useful surfactant-thickeners.

Various tests have been run to illustrate the characteristics of the hydroxysulfonated styrene-butadiene copolymer of this invention. The results of these tests are shown by the graphs of FIGS. 1–5.

Figure 2:
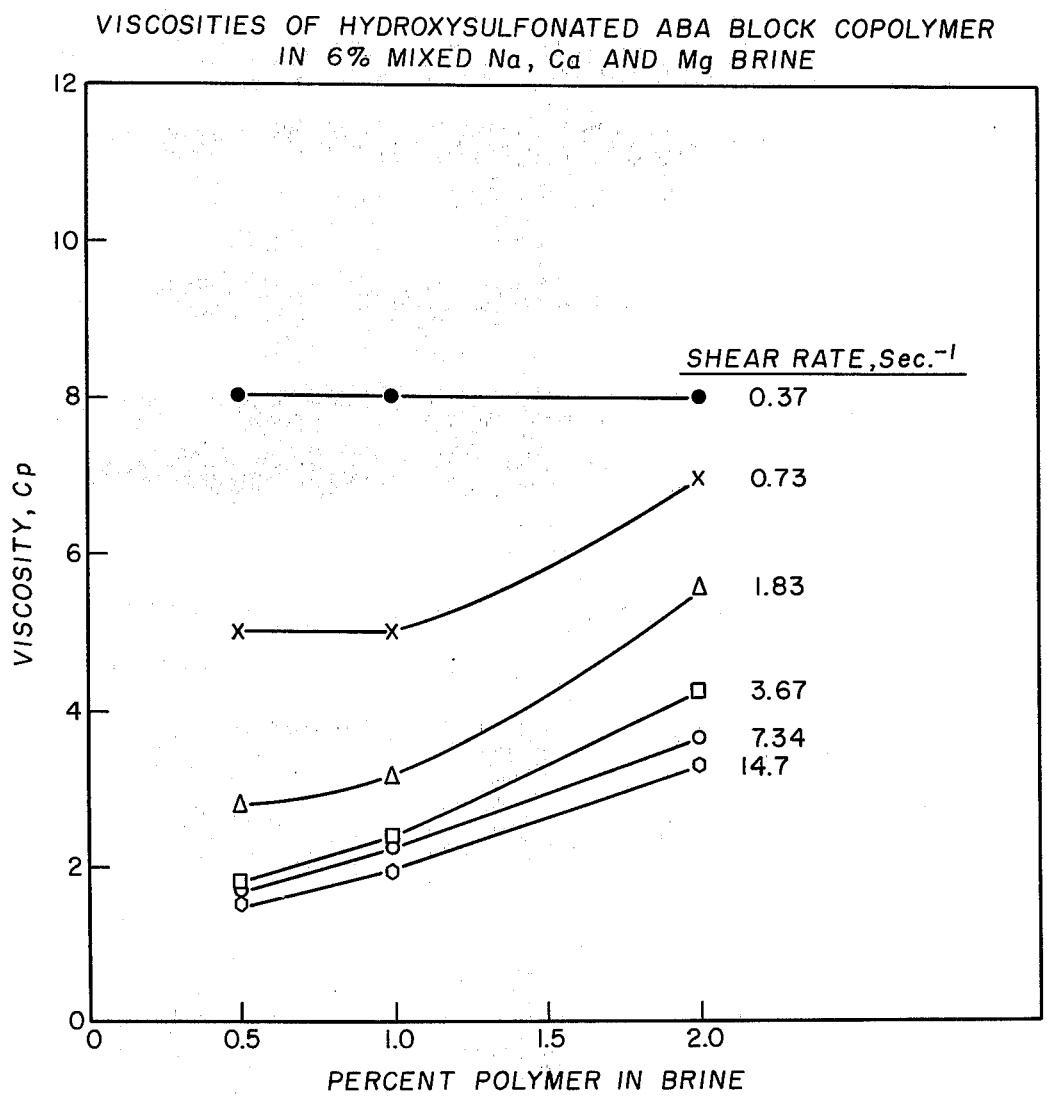
FIG. 2 is a plot of curves similar to FIG. 1 for the same polymer but dissolved in 6% mixed Na, Ca and Mg brine.

In FIG. 1 there are shown six curves which illustrate the change in viscosity of a hydroxysulfonated ABA block copolymer (styrene (15%)-b-butadiene (70%)-b-styrene (15%)) in distilled water with polymer concentration at six different shear rates and in FIG. 2 there are shown six similar curves for the same polymer dissolved in 6% mixed Na, Ca and Mg brine. The curves of FIGS. 1 and 2 show that the viscosity at 0.5% concentration is very little different whether the copolymer is dissolved in distilled water or brine. A greater difference is seen at 2% concentration but the viscosity of the solution in brine is shown to be sufficiently high to provide an effective solution for displacing oil through an oil-containing formation. The FIGS. 1 and 2 only extend to polymer concentrations of 2%, but the viscosity both in distilled water and brine would predictably increase with increasing concentrations of polymers. By the comparison of FIGS. 1 and 2 it is seen that the hydroxysulfonated styrene-butadiene copolymers of this invention are tolerant to brines from the standpoint of solution viscosities.

Figure 3:
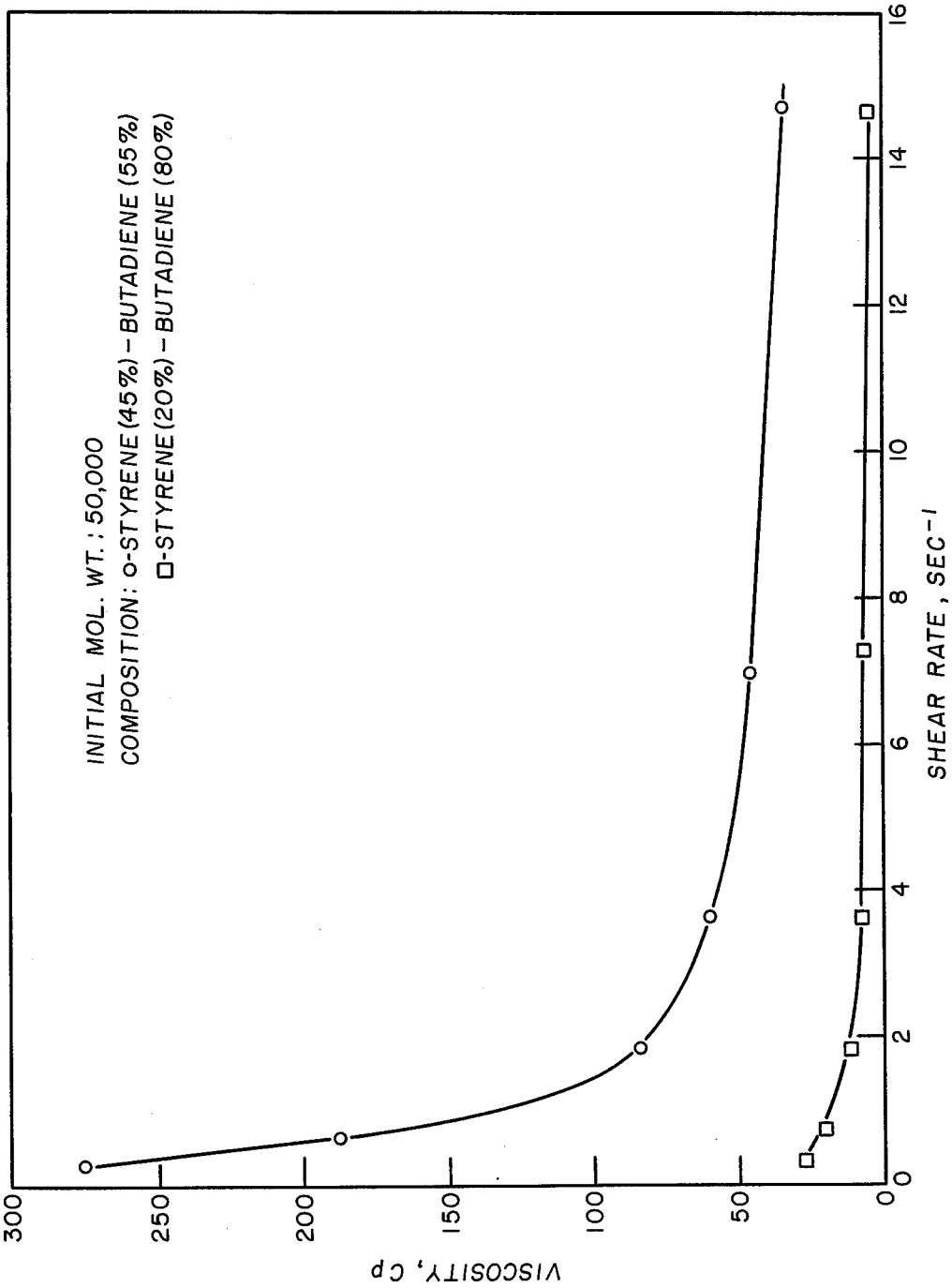
FIG. 3 is a plot of curves illustrating the viscosity versus shear rate characteristics of two copolymer compositions at 0.25% copolymer concentration in distilled water.
Figure 4:
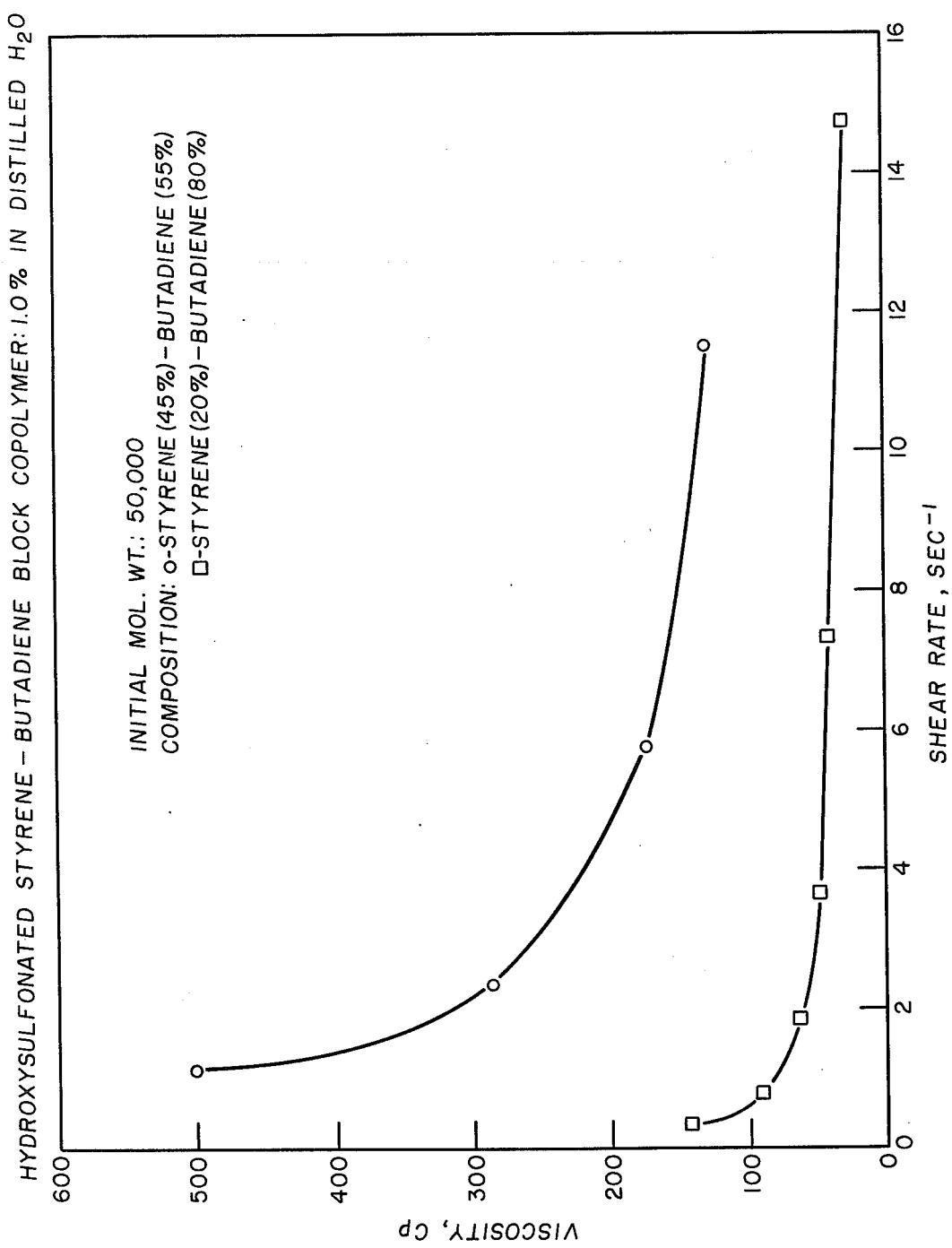
FIG. 4 is a plot similar to FIG. 3 but at a copolymer concentration of 1.0% in distilled water.

With reference to FIGS. 3 and 4 there is shown the effect of composition of the hydroxysulfonated copolymer at two different copolymer compositions (styrene (45%)-butadiene (55%) and styrene (20%)-butadiene (80%)) and at two different polymer concentrations 0.25% and 1.0% in distilled water. From these curves it is seen that the polymer composition having the higher styrene content yields the greater viscosity and that increasing the polymer concentration also increases the viscosity.

Figure 5:
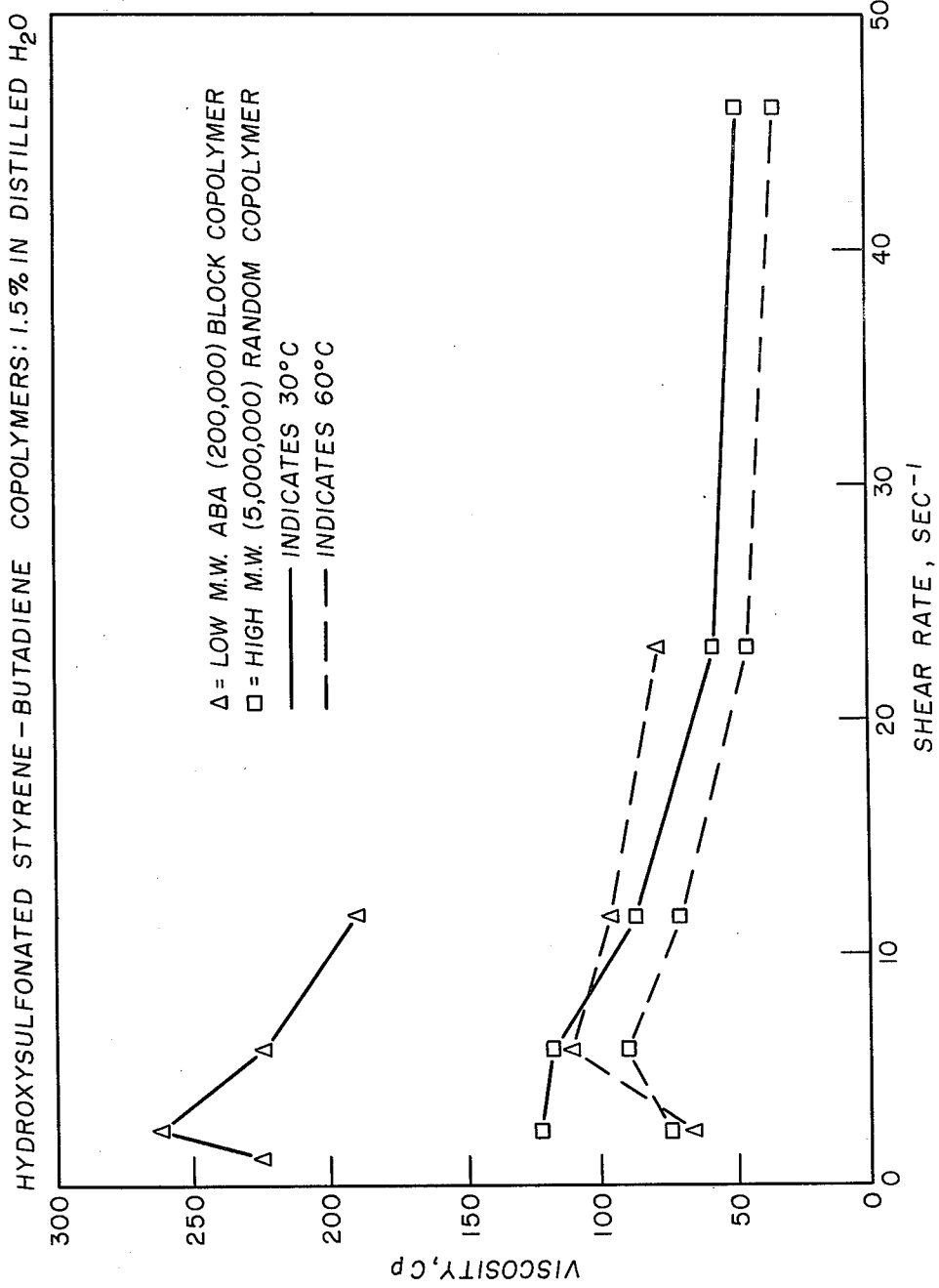
FIG. 5 is a plot of curves illustrating the viscosity versus shear rate characteristics of a low molecular weight (200,000) hydroxysulfonated ABA styrene-butadiene copolymer of this invention compared to a high molecular weight (5,000,000) random copolymer.

With reference to FIG. 5 there is shown curves which indicate the viscosity versus shear characteristics of a low molecular weight (200,000) hydroxysulfonated ABA styrene-butadiene block copolymer of this inven- This invention is further illustrated by the experimental work described below.

EXAMPLE I

Structures I to VIII were prepared according to known art, where S—S—S varied from 5 percent to 95 percent by weight and B B B correspondingly varied from 95 percent to 5 percent by weight. The molection as compared to a high molecular weight (5,000,000) random copolymer at 30° C. and 60° C.

We claim:

1. In a method of recovering oil from an oil-containing subterranean formation penetrated by an injection well and a production well and wherein an aqueous fluid is injected via said injection well into said formation to displace said oil to said production well, the improvement comprising employing in at least a portion of said aqueous fluid injected via said injection well into said formation a water soluble copolymer in an amount sufficient to thicken said portion of said aqueous fluid and improve the efficiency thereof in displacing said oil to said production well, said copolymer having a molecular weight within the range of 50,000 to 500,000 and having long sequences of an oil soluble nonionic segment formed of polymer blocks of a styrene monomer and long sequences of a water soluble anionic segment formed of polymer blocks of a butadiene monomer chemically modified to provide a hydroxysulfonate group thereon as the anionic function, said copolymer having the following structural formula:

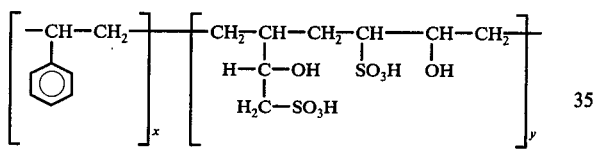

where the ratio of $x:y$ is equal to or less than 1.

2. The method of claim 1 wherein said copolymer is a block or graft copolymer having a molecular structure represented by any of the following structures, when S—S—S represents polystyrene blocks and B B B represents polybutadiene blocks:

I. S—S—S—B∿B∿B
II. S—S—S—B∿B∿B—S—S—S
III. B∿B∿B—S—S—S—B∿B∿B

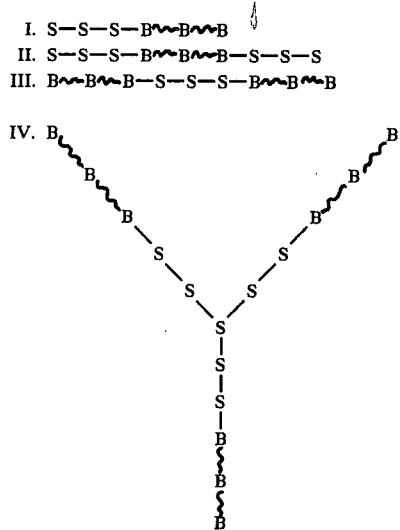

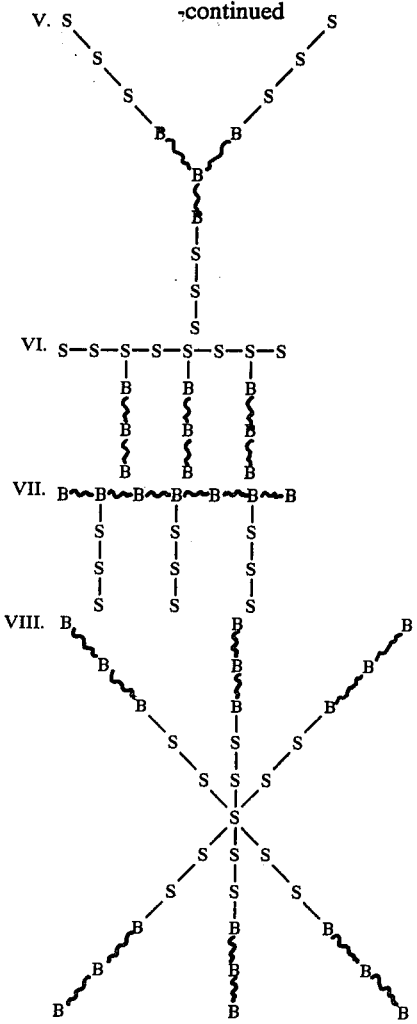

3. In a method of recovering oil from an oil-containing subterranean formation penetrated by an injection well and a production well and wherein an aqueous fluid is injected via said injection well into said formation to displace said oil to said production well, the improvement comprising employing in at least a portion of said aqueous fluid injected via said injection well into said formation a water soluble copolymer in an amount sufficient to thicken said portion of said aqueous fluid to improve the efficiency thereof in displacing said oil to said production well, said copolymer having a molecular weight within the range of 50,000 to 500,000 and having long sequences of an oil soluble nonionic segment formed of polymer blocks of a styrene monomer and long sequences of a water soluble anionic segment formed of polymer blocks of a butadiene monomer chemically modified to provide a hydroxy sulfonate group therein as the anionic function, said copolymer being represented by the following structural formula:

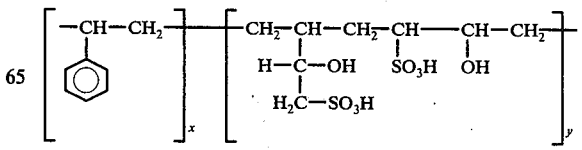

wherein the ratio of $x$ to $y$ is selected to provide a copolymer derived from one having an initial composition ranging from 20% styrene - 80% butadiene to 45% styrene - 55% butadiene.

4. The method of claim 3 wherein the ratio of $x$ to $y$ is selected to provide a copolymer derived from one having an initial composition of about 45% styrene and 55% butadiene.

5. The method of claim 3 wherein said copolymer is of A—B—A configuration and has a molecular weight of about 200,000.

* * * * *